(12) United States Patent
Webster et al.

(10) Patent No.: US 6,838,504 B1
(45) Date of Patent: Jan. 4, 2005

(54) INTEGRATED FIXATION SYSTEMS

(75) Inventors: William C Webster, Auburn, AL (US); Peter Hurley, West Yorkshire (GB)

(73) Assignee: Solucorp Industries Ltd., West Nyack, NY (US)

( * ) Notice: Subject to any disclaimer, the term of this patent is extended or adjusted under 35 U.S.C. 154(b) by 0 days.

(21) Appl. No.: 09/646,544

(22) PCT Filed: May 6, 1999

(86) PCT No.: PCT/CA99/00383

§ 371 (c)(1),
(2), (4) Date: Sep. 13, 2001

(87) PCT Pub. No.: WO99/56867

PCT Pub. Date: Nov. 11, 1999

Related U.S. Application Data

(63) Continuation-in-part of application No. 09/072,771, filed on May 6, 1998, now abandoned.

(30) Foreign Application Priority Data

Dec. 21, 1998 (WO) .............................. PCT/CA98/01156

(51) Int. Cl.$^7$ ................................................. C08K 3/32
(52) U.S. Cl. ....................... 524/414; 524/417; 524/420; 524/436; 429/49
(58) Field of Search ................................ 524/414, 417, 524/420; 429/49

(56) References Cited

U.S. PATENT DOCUMENTS

| | | |
|---|---|---|
| 777,851 A | 12/1904 | Gregory |
| 4,075,400 A | 2/1978 | Fritts |
| 4,184,007 A | 1/1980 | Urry |
| 4,239,865 A | 12/1980 | Tarao et al. |
| 4,269,905 A | 5/1981 | Wedlake |
| 4,280,925 A | 7/1981 | Kiefer |
| 4,629,509 A | 12/1986 | O'Hara et al. |
| 5,116,701 A | 5/1992 | Kalisz |
| 5,213,858 A | 5/1993 | Tanner et al. |
| 5,221,587 A | 6/1993 | Bohnstedt et al. |
| 5,229,686 A | 7/1993 | Fowler et al. |
| 5,248,342 A | 9/1993 | Montgomery et al. |
| 5,270,136 A | 12/1993 | Noland |
| 5,277,997 A | 1/1994 | Rao et al. |
| 5,409,769 A | 4/1995 | Fukumoto et al. |
| 5,527,982 A | 6/1996 | Pal et al. |
| 5,536,899 A | 7/1996 | Forrester |
| 5,736,813 A * | 4/1998 | Foust et al. .................. 313/490 |
| 5,762,716 A | 6/1998 | Lockard et al. |
| 5,827,347 A | 10/1998 | Margulis |
| 5,877,393 A | 3/1999 | Webster |
| 6,180,037 B1 * | 1/2001 | Andersen et al. ........... 264/108 |

FOREIGN PATENT DOCUMENTS

| | | |
|---|---|---|
| CA | 972498 | 8/1975 |
| CA | 2134101 | 11/1993 |
| EP | 0 202 653 | 11/1986 |
| GB | 1 424 076 | 2/1976 |
| GB | 2 282 100 A | 11/1993 |
| JP | 53144182 | 12/1978 |
| JP | 60249251 | 12/1985 |
| JP | 63086358 | 4/1988 |
| JP | 08115738 | 5/1996 |
| JP | 09 227855 | 9/1997 |
| JP | 09 314099 | 12/1997 |
| WO | WO 92/01556 | 2/1992 |
| WO | WO 93/22125 | 11/1993 |
| WO | WO 96 14901 | 5/1996 |

OTHER PUBLICATIONS

J.R. Conner, Chemical Fixation and Solidification of Hazardous Waste, B. Van Nostrand Reinhold, 1990, *Fixation of Metals,* Chapter 4, pp. 58–171.

*Hazardous Waste Management System; Identification and Listing of Hazardous Waste; Toxicity Characteristic Revisions; Final Rule,* Environmental Protection Agency, Part V, 40 CFR Parts 261, 264, 265, 268, 271 and 302, Federal Register, vol. 55, No. 126, Jun. 29, 1990, 26 sheets.

\* cited by examiner

*Primary Examiner*—Edward J. Cain
(74) *Attorney, Agent, or Firm*—Christie, Parker & Hale, LLP

(57) ABSTRACT

The invention provides polymeric matrices and films comprising fixation reagents that are capable of reacting with solubilized metals to form less soluble metal compounds. The fixation reagenst may include inorganic sulfides and phosphates, as well as adsorbents. The polymeric matrices may be comprised of polyvinyl alcohols and polyvinyl acetates. In some embodiments, the polymeric matrix is selected to be at least as soluble as the selected fixation reagent, particularly under the conditions in which the matrix is expected to come into contact with the solublized metal.

11 Claims, 2 Drawing Sheets

INTEGRATED FIXATION SYSTEMS

This application is a CIP of Ser. No. 09/072,771, filed May 6, 1998, now abandoned.

FIELD OF THE INVENTION

The present invention is in the field of apparatuses and methods for controlling release of solubilized metal wastes, including those metals which are the subject of environmental regulations. In particular, the containers of the present invention provide capsules, absorbent mats or polymeric membranes which are adapted to release compositions that are capable of reacting with solubilized metals to produce insoluble metal compounds.

BACKGROUND OF THE INVENTION

Severe environmental contamination has resulted from the disposal of used apparatuses, including devices, instruments or appliances when such apparatuses contain metals in a form which can leach into the environment. Examples of such apparatuses are listed in Table 1.

TABLE 1

Apparatus Examples

| Apparatus | Solubilized Metals |
|---|---|
| Lead-acid batteries | Lead |
| Rechargeable Ni—Cd batteries | Cadmium, nickel |
| Other Ni—Cd batteries | Cadmium, nickel |
| Alkaline-manganese batteries | Mercury, zinc |
| Nickel-zinc batteries | Nickel, zinc |
| Nickel-metal hydride batteries | Nickel |
| Iron electrode batteries | Nickel, silver |
| Zinc-carbon batteries | Mercury, zinc |
| Mercuric oxide batteries | Mercury |
| Silver oxide batteries | Cadmium, silver, zinc |
| Vanadium batteries | Vanadium |
| Mercury switches | Mercury |
| Mercury thermostats | Mercury |
| Fluorescent lighting tubes | Mercury |
| Mercury vapor lamps | Mercury |
| Metal halide lamps | Mercury |
| Sodium lamps | Mercury |
| mercury instruments and appliances | Mercury |
| Electronic circuitry | Arsenic, beryllium, cadmium, silver |
| Treated wood | Arsenic, chromium |
| Semiconductors | Arsenic, cadmium, selenium |
| Solar photovoltaic cells | Arsenic, cadmium, selenium |

Many types of apparatuses, such as those listed in Table 1, are manufactured which contain solubilized metals at some point during their use, storage or disposal. Each type of apparatus raises specific concerns regarding the manner in which contamination may enter the environment. Manufacturers of these apparatuses are coming under increasing pressure from new environmental regulations. Increasing regulation is also bringing about an increase in recovery and recycling of soluble metals from such apparatuses. Each type of apparatus has its own characteristic patterns of manufacture, use and recovery.

Lead-acid batteries have often been segregated from other waste for disposal. Facilities have been established to crush the batteries and reclaim the elemental lead. However, such batteries may leak during storage prior to disposal. Also, lead-acid batteries contain sulfuric acid, which is capable of dissolving the lead. As a result of these problems, it is common for the recycling sites to have contaminated soil and ground water, resulting in the need for expensive environmental remediation at such sites.

The lead-acid battery industry is a major consumer of lead in the United States. Starting-lighting-ignition (SLI) lead-acid batteries are primarily employed in transport vehicles (e.g. cars, trucks, buses, planes, golf carts, etc.) and as an emergency source of power. According to the Battery Council International (BCI), an industry organization, SLI battery production in the U.S. averaged approximately 100 million units per year from 1994 through 1997. This consumed an estimated 70% of the annual U.S. lead production or some 1.08 million metric tons per year.

Recycling lead from spent SLI batteries, referred to as secondary lead, is a major source of the annual production of lead. Currently, about 68% of the yearly U.S. consumption of lead is from secondary sources, the majority of which (about 90%) is from recycled SLI batteries. In 1997, in the U.S., 30 plants were actively engaged in the production of secondary lead.

A 1996 study by the BCI estimates a SLI battery recycle rate in the U.S. of approximately 98%. The 2% which is not recycled is likely discarded as municipal solid waste (MSW). Even if the recycling percentage in the U.S. is as high as 98%, the 2% not recycled could represent some 22,000 metric tons per year of lead impacted materials being improperly disposed of and accessible to pollute the environment. Greenpeace, an environmental organization, estimates that only 80% to 90% of spent lead-acid batteries were recycled in the U.S. as of 1993.

Some studies indicate that about 138,000 tons, or 65%, of the lead found in the municipal solid waste stream comes from lead-acid batteries. When improperly disposed of, lead-acid batteries can corrode and release soluble lead and lead contaminated sulfuric acid into the environment, which in turn can pollute lakes, rivers, streams, ground water and eventually drinking water. In the event that lead-acid batteries are incinerated, lead will be released into the air and/or remain in the ash; in either case, a potentially dangerous environmental condition exists.

Rechargeable nickel-cadmium (Ni—Cd) batteries are ubiquitous in modern society as power sources for a wide variety of articles such as cellular and cordless phones, camcorders, CD players, laptop computers and cordless power tools. The number of Ni—Cd batteries produced each year may be in the hundreds of millions in the U.S. alone.

When initially introduced, Ni—Cd batteries were typically and inadvertently disposed of in MSW. However, in 1996, in the U.S. a Federal law, The Mercury Containing and Rechargeable Battery Act (Public Law 104-142) was enacted to facilitate the efficient recycling of rechargeable Ni—Cd batteries, as well as to restrict the manufacture and use of certain mercury-containing batteries. Title I of that Act establishes uniform national labeling requirements for Ni—Cd batteries, small sealed lead-acid batteries, and certain other regulated batteries. Each battery or battery pack must bear a recycling symbol and recycling phrase appropriate to its electrical chemistries. Recovery of the metals in Ni—Cd batteries is currently conducted at only one facility in the United States. While these initiatives are a partial solution, they are not the total answer. Currently, it is estimated that the recycling rate for Ni—Cd batteries is only about 15%.

Over the last decade the consumption of mercury has been steadily decreasing due in part to the pressure to avoid disposing of mercury products into the environment. This has also resulted in greater recycling of mercury. In the United States, establishment of land disposal restrictions on mercury-containing waste has made secondary sources more cost effective than primary sources, in contrast to other nations where primary mercury is still predominantly used. Title II of the Mercury-Containing and Rechargeable Battery Act phases out the use of most batteries containing mercury as a base chemical or additive. Title II of that Act also phases out the use of most alkaline-manganese and zinc carbon batteries containing intentionally added mercury and button cell mercuric oxide batteries. Other mercury oxide batteries will be allowed with certain limitations.

The total amount of mercury use in the United States is declining, although there is still a large amount used, generally in small increments, in a variety of apparatuses. The amount of mercury in each apparatus is generally quite small. Typically, a thermometer contains 0.5 g to 3 g, thermostats 3 g, mercury switches 3.5 g, and fluorescent lights 10 mg to 40 mg.

Previously, soluble-metal-containing devices, such as those listed in Table 1, have often been included in (MSW) disposal, a practice which may pollute the ground water in the vicinity of the municipal landfills.

Various approaches have been developed to bring about the environmental remediation of metal-contaminated sites, including remediation of sites contaminated with various apparatuses that contain soluble metals in a form which can leach into the environment. In some cases, the contaminated soil is removed to a secure landfill, where protection is obtained by placing the soil between layers of synthetic liner materials. The United States Environmental Protection Agency (U.S. EPA) has developed treatment requirements for such materials, which require that the leaching of the metals must be controlled prior to placement in land fills. In other cases, on-site treatment of the soil is used to render the soil nonhazardous by EPA standards. After on-site treatment, depending on environmental regulations, contaminated soil may be reused or disposed of in a nonhazardous waste landfill. Ground water contamination at these sites may be addressed by extraction wells, treatment systems, and reinjection of the treated ground water. Various treatment approaches have been developed for treatment of the soils and ground water.

There is a need for systems to ameliorate leaching of soluble metals from various types of metal-containing apparatuses. Such apparatuses have the potential to cause environmental damage when solubilized metals are released into the environment.

Environmental regulations in some countries have established both test procedures and concentration limits for the metals. In the event that wastes containing these metals exceed the limits, the wastes may be considered hazardous under the relevant regulations. The U.S. EPA has promulgated an acid extraction procedure for use in classifying wastes: the Toxicity Characteristic Leaching Procedure (TCLP, described in EPA SW-846 Method 1311, incorporated herein by reference). Universal Treatment Standards (UTSs, described in the Land Disposal Restriction Requirements Draft Phase IV rule, incorporated herein by reference) have been promulgated, including lower leaching limits and a more complete list of metals of concern. Other leaching procedures are also used in the evaluation of soluble metals. In particular, the U.S. EPA has developed the Synthetic Precipitation Leaching Procedure (SPLP, described in EPA SW-846 Method 1312, incorporated herein by reference) which utilizes synthetic rainwater rather than the stronger extraction fluids which are used in the TCLP.

Table 2 summarizes the existing TCLP limits and the promulgated UTS limits for solubilized metals in soils and other non-wastewaters. Such limits are set out merely as examples and may change from time to time and may differ from one jurisdiction to another.

TABLE 2

| | Leaching Limits (mg/l) | |
|---|---|---|
| Metal (Symbol) | Existing TCLP | Promulgated UTS |
| Arsenic (As) | 5.0 | 5.0 |
| Antimony (Sb) | — | 1.15 |
| Barium (Ba) | 100 | 21.0 |
| Beryllium (Be) | — | 1.22 |
| Cadmium (Cd) | 1.0 | 0.11 |
| Chromium (Cr) | 5.0 | 0.60 |
| Lead (Pb) | 5.0 | 0.75 |
| Mercury (Hg) | 0.2 | 0.025 |
| Nickel (Ni) | — | 11.0 |
| Selenium (Se) | 1.0 | 5.7 |
| Silver (Ag) | 5.0 | 0.14 |
| Thallium (Tl) | — | 0.20 |
| Vanadium (V) | — | 1.6 |
| Zinc (Zn) | — | 4.3 |

Those skilled in the art will understand that other soluble metals may require environmental control, such as radioactive metals, including radioactive cobalt, uranium, plutonium, americium, thorium, cesium and strontium.

Fixation reagents have previously been incorporated into a variety of polymeric matrices, such as ion-exchange matrices, that are resistant to release of the fixation reagent. Such matrices are typically resistant to degradation, and may be intended for long term use in aqueous environments. For example, U.S. Pat. No. 4,239,865 discloses a polyvinyl (dialkylthiocarbamoylthio) acetate resin, in which the fixation reagent is incorporated into the polymer, which is said to be insoluble in water or benzene. Similarly Canadian Patent No. 972,498 discloses covalently-modified heavy-metal-binding resins obtained by reacting nitrogen groups on the resin with carbon disulfide. Zinc sulfide has also been suggested for use as a metal-binding agent in a water-insoluble hydrophilic matrix, as disclosed in U.S. Pat. No. 4,280,925. Matrices that are insoluble in water, but soluble in stomach acid, have been suggested for specialized use as a coating for lead paint, with the disclosed intention that such coatings will remain on the paint and not release the fixation reagents unless the paint is ingested, in which case the metal-binding agents will leach out of the matrix to bind lead so that it is not poisonous. Water-insoluble films of polyvinyl alcohol that have been cured with borax are disclosed for such applications in U.S. Pat. No. 4,112,191.

SUMMARY OF THE INVENTION

In one aspect, the invention provides a polymeric matrix comprising a fixation reagent, wherein the matrix comprises a water-soluble polymeric component that is at least as water-soluble as the fixation reagent under selected reaction conditions, and the fixation reagent is capable of reacting with a soluble metal to form a fixed metal compound that is less soluble than the soluble metal. It will be seen that a polymeric matrix of this kind functions in a manner which is essentially the reverse of prior art water-insoluble films that may leach a fixation reagent under appropriate conditions. In this aspect of the invention, the polymeric component of the matrix may be selected so as to be completely solubilized while the fixation reagent remains substantially in place, so that the fixation reagent residue of the polymeric matrix may serve as a barrier to the leaching of environmentally harmful heavy metals.

In an alternative embodiment, the invention provides an apparatus comprising a barrier separating a soluble metal from a fixation reagent, wherein the barrier is a polymeric matrix as described above. The soluble metal and polymeric matrix may be housed in the apparatus, i.e., they may together be retained as parts of the apparatus. The barrier may be rupturable to expose the soluble metal to additional fixation reagent contained by the polymeric matrix. When the soluble metal is exposed to the fixation reagent, a reaction may occur, under appropriate conditions, between the soluble metal and the fixation reagent to form a fixed metal compound that is less soluble than the soluble metal. In one embodiment, the fixed metal compound may be a substantially insoluble metal compound. The polymeric matrix of the invention may form part of a soluble metal container, such as a bag for disposing of soluble-metal-containing wastes.

In the context of the present invention, the word "housing" or "housed" is not to be understood as limiting the relevant structures to enclosures that completely encase a material. Rather, a housing denotes a physical connection that brings parts together as, for example, parts of the apparatus of the invention are housed in the apparatus in the sense that they are kept together as parts of the apparatus. Accordingly, soluble metals or fixation reagents may be housed in various embodiments of the invention by their incorporation into a single apparatus, and the apparatus need not encase or surround these parts of the apparatus.

In accordance with various aspects of the invention, the soluble metal may be selected from the group consisting of the following elements and compounds thereof: lead, nickel, cadmium, mercury, zinc, silver, vanadium, arsenic, beryllium, selenium, antimony, barium, chromium, thallium, cobalt, uranium, plutonium, thorium, strontium, cesium and americium. In one embodiment, the soluble metal is selected from the group consisting of the following elements and their compounds: lead, cadmium, and mercury.

In accordance with various aspects of the invention, the fixation reagent may be selected from the group consisting of sulfides, phosphates, hydroxides, silicates and carbonates. In one embodiment, the fixation reagent is selected from the group consisting of sulfides and phosphates. Where the fixation reagent is a sulfide, the fixed metal compound may be a substantially insoluble sulfide of the soluble metal. Where the fixation reagent is a phosphate, the fixed metal compound may be a substantially insoluble phosphate of the soluble metal.

An apparatus housing the fixation reagents and the soluble metal may be a battery, and the battery may have an electrode that comprises the soluble metal. The battery may be a lead-acid battery wherein the soluble metal comprises lead. The lead-acid battery may have an external casing, and a portion of the casing may house the fixation reagent. Similarly, the battery may be a nickel-cadmium battery wherein the soluble metal comprises cadmium or nickel, and a portion of the casing of the nickel-cadmium battery may house the fixation reagent, for example by being comprised of a polymeric matrix of the invention.

In various aspects, the present invention involves the utilization of integrated fixation systems in the manufacture of apparatuses, including devices, instruments, or appliances which contain metals in a form which can leach into the environment. In accordance with the invention, integrated waste treatment systems are provided in which various apparatuses are adapted to ameliorate leaching of soluble metals into the environment. For example, lead-acid batteries, which contain soluble lead, and Ni—Cd batteries, which contain soluble cadmium and nickel, may be modified in accordance with the invention to ameliorate leaching of lead, cadmium, and nickel from such devices when they are damaged or discarded. Examples of fixation systems and compositions of the present invention include sulfide and phosphate fixation systems which react with the solubilized metals to produce relatively insoluble metal sulfides and phosphates. Other fixation systems may be used, either alone or in combination, including, among others, pH control, oxidizers, reducers, cementitious systems, and sorbents. In one aspect of the present invention, the quantity of the reactive composition provided in the apparatus is measured to achieve a generally stoichiometric reaction with the solubilized metal component of the apparatus, without providing an excess of reagent.

In accordance with the invention, a container for fixation reagents may be provided, such as a container made out of a polymeric matrix of the invention. In particular, fixation reagent containers of the present invention may be adapted to provide a mechanism whereby soluble metals may be reacted with fixation reagents while the metals are still contained within the apparatus or in the vicinity thereof. In accordance with the invention, the fixation reagents may react with the solubilized metals to form insoluble metal compounds when the reagents are either released from the container or the reagents are accessed by the solubilized metals while the reagents are within the fixation reagent container. The escape of solubilized metals from the apparatus into the environment is ameliorated by this reaction. Apparatuses of the invention may include, among other things, various types of batteries, mercury switches, ballast from fluorescent lights, electronic circuit boards, solar panels or cells and the like. The reagent containers of the invention may include, among other things, capsules, impregnated mats, polymeric matrices and the like. Reagents of the invention may include, among other things, sulfides, phosphates, buffers and the like in either liquid, slurry or solid form. In accordance with one aspect of the present invention, the reagent container may be integrated into the apparatus, such that reagents are generally released or made accessible when the useful life of the apparatus has been completed, either during storage prior to disposal of the apparatus or on disposal of the apparatus.

In some embodiments, the fixation reagents may be dispersed within a variety of matrices, such as a degradable or perforated polymeric matrix. An aspect of the invention is therefore to provide a polymeric matrix incorporating fixation reagents, wherein the polymeric matrix is adapted to be permeable in a manner that facilitates the eventual contact between solubilized metals and fixation reagents. The permeability of the matrix may be established at the outset, in its formulation, for example by providing a perforated or absorbent matrix. Alternatively, the matrix may be adapted to be degradable, such as biodegradable or soluble matrices (such as water soluble matrices). In alternative embodiments, the matrix may be adapted to become permeable when exposed to a solvent such as water.

The polymeric matrix of the invention may be partly or wholly coated with a barrier, such as a degradable or perforated barrier. The barrier material may be selected to permit the protection of the fixation reagents in a dormant (unreacted) state, inhibiting the release of active fixation reagents, while also permitting degradation of the barrier at an appropriate time so that the fixation reagent in the matrix may be released or made accessible to solubilized metals. In alternative embodiments, the components of the fixation reagent may be separately dispersed in layers of the matrix as a multi-layer laminate, or separately dispersed in localized zones of the polymeric matrix, keeping the constituent components of the fixation reagent separate until they are allowed to mix as a result of the degradation of the matrix or infiltration of the matrix by a solvent such as water that mobilizes the fixation reagent. The separation of fixation reagents in such embodiments may increase the stability of the fixation reagents for the period while the matrix is intact.

In further alternative embodiments of the polymeric matrix, adsorbent compounds may be added such as activated carbon; metal oxides; synthetic materials such as activated alumina, organic polymers, zeolites and equivalents thereof; natural materials such as clays (with or without modification), Fuller's earth, diatomaceous earth (with or without modification), peat moss, vermiculite, natural zeolites and equivalents thereof. Adsorbents may be combined, for example, with sulfide fixation reagents (such as CaS), and such combinations may be formulated to ameliorate the emission of hydrogen sulfide from the fixation reagents.

DETAILED DESCRIPTION OF THE INVENTION

Figure 1:
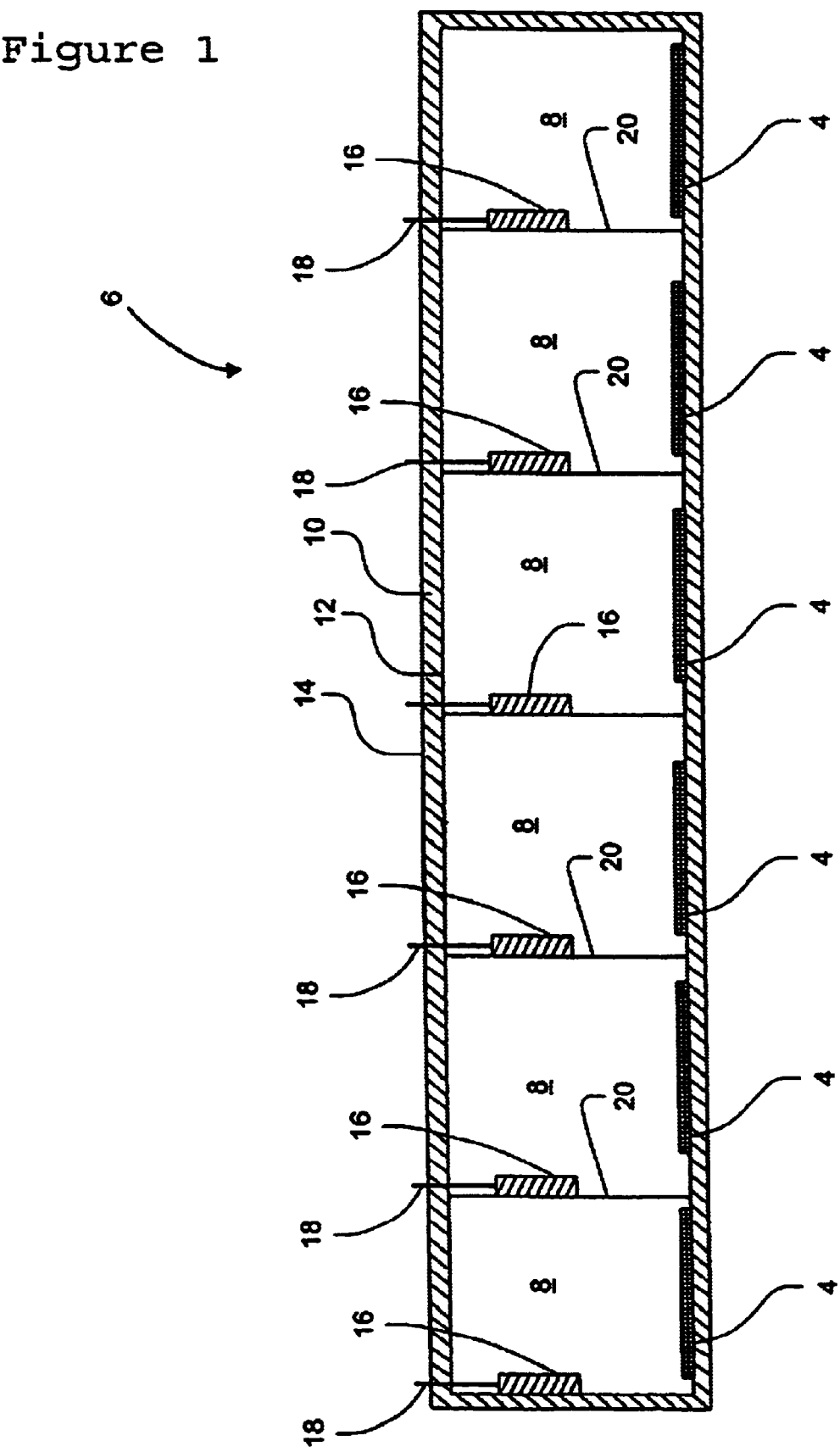
FIG. 1 is a schematic side elevational, cross-sectional view of a lead-acid battery comprising six compartments, each with various adaptations for housing fixation reagents and soluble metals.

The present invention may be better understood by reference to the following detailed descriptions of specific applications of the invention to several types of apparatuses. The invention may be applied by those skilled in this art in accordance with the teachings herein and the common general knowledge in the art, in a similar manner, to other apparatuses.

In one aspect, the present invention involves the utilization of integrated soluble metal fixation systems in the manufacture, use or disposal of various apparatuses, including devices, instruments, or appliances, which contain soluble metals in a form which can leach into the environment. For example, lead-acid batteries, which contain soluble lead, and Ni—Cd batteries, which contain soluble cadmium and nickel, may be modified in accordance with the invention to ameliorate leaching of solubilized lead, cadmium, and nickel from such devices when they are damaged or discarded. Examples of fixation reagents and compositions of the present invention include sulfide and phosphate fixation reagents which react with soluble metals to produce relatively insoluble metal sulfides and phosphates. Other fixation systems may be used, either alone or in combination, including, among others, pH control, oxidizers, reducers, cementitious systems, and sorbents.

In one aspect of the present invention, the quantity of fixation reagents provided in the container is measured to optimize the reaction between the fixation reagents and the soluble metal component(s) of the apparatus. As a result, in such an embodiment, the optimum fixation reagent combination can be used in the correct dosage, avoiding concerns with either over dosing or under dosing of the fixation reagents. Under dosing fixation reagents may fail to adequately control leaching of soluble metals because of incomplete fixation, resulting in environmental releases of solubilized metals. Over dosing of fixation reagents, beyond the cost disadvantage, may also create problems with particular fixation reagents. For example, overdosing of sulfide fixation reagents could result in reactive sulfides being released into the environment, or the release of toxic hydrogen sulfide ($H_2S$) gas produced from the reactive sulfide fixation reagents.

In accordance with the present invention, the application of fixation reagents to soluble metal contaminants before they are released from an apparatus, rather than treating contaminated soil or water after the soluble metal has been released, in effect reduces the volume of waste to be treated and facilitates more efficient reaction of the fixation reagents with the soluble metals.

As used herein, "apparatus" has its ordinary meaning, encompassing in various embodiments of the invention any device, instrument, appliance or other thing that contains soluble metals in a form that can leach into the environment during storage, use, or disposal of the apparatuses. Examples of such apparatuses include, but are not limited to, lead-acid automotive batteries, nickel-cadmium rechargeable batteries, mercury batteries, mercury switches, ballasts from fluorescent light fixtures, electronic circuit boards, solar panels/cells and the like, such as are listed in Table 1.

In the context of the present invention, in accordance with the understanding of those skilled in the art of the invention, "soluble metals" are metals, or metal compounds or complexes, that are capable of becoming solubilized, i.e. entrained in a solvent, and hence capable of leaching into the environment. Solubilized metals are generally ionic, or in an equilibrium state with an ionic form, and may be complexed with other compounds. Soluble metals may be soluble in aqueous or non-aqueous media, and may become solubilized directly by a solvent or with the assistance of other factors such as heat, light or microbiological action. Metals may be present in an apparatus in a soluble form, or may become soluble during use, storage, or disposal of an apparatus. The term 'soluble metal' specifically includes those metals which are the subject of regulations promulgated from time-to-time by the U.S. EPA relating to the disposal of the metal or the concentration level of the metal in the environment (or the subject of similar environmental regulations in other jurisdictions).

In accordance with the understanding of those skilled in the art of the invention, "fixation" is the chemical reaction of a fixation reagent with a soluble metal to form a fixed metal compound that is less soluble than the soluble metal. Preferably, the fixation reaction produces an insoluble metal compound that is substantially insoluble in aqueous media. Preferably, the fixation reaction provides fixed metal compounds that are soluble at rates which make the solubilized metal available in the environment at concentrations below limits which are acceptable in accordance with prevailing environmental regulations, such as regulations promulgated from time-to-time by the U.S. EPA or similar agencies in other jurisdictions.

In accordance with the invention, a "barrier" may be any means for physically separating soluble metals and fixation reagents, such as polymeric, metallic or vitreous members and equivalents thereof. Such barriers may be ruptured physically or chemically so that they break down to expose fixation reagents to soluble metals. In some embodiments, barriers may be adapted to rupture when an apparatus is crushed. Alternatively, an actuator may be provided on an apparatus for rupturing a barrier in the apparatus automatically or manually. Alternatively, the barrier may be rupturable by degradation over time, for example biodegradable or water-soluble barriers may be provided that are susceptible to decay after an article is disposed of.

In various aspects of the present invention, a "fixation reagent container" may be any receptacle or means for retaining fixation reagents apart from the soluble metals with which they would otherwise react. Similarly, a "soluble metal container" may be any receptacle or means for retaining soluble metals apart from the fixation reagents with which they would otherwise react. In various embodiments, containers may include capsules and equivalent structures that enclose fixation reagents or soluble metals. In alternative embodiments, containers may include impregnated materials such as mats that may be impregnated or coated with fixation reagents or soluble metals, and equivalents thereof. In some embodiments, mats may be enclosed in capsules. More than one container may be used in a particular apparatus. For example, capsules and mats may both be integrated into the construction of an apparatus. Capsules may be rupturable by being breakable, degradable or dissolvable, or any other means of rupture, to facilitate release of fixation reagents or soluble metals at an appropriate time. Similarly, mats may be integrated into the construction of an apparatus in a manner that facilitates the occurrence of a fixation reaction between a fixation reagent and a soluble metal when a soluble metal is released from an apparatus in the vicinity of the mat. Mats may be made of a polymeric matrix, and the polymeric matrix may be degradable, such as biodegradable or water-soluble matrices, with fixation reagents incorporated into the matrix. Mats may take the form of liners, such as drum liners or landfill liners (for which drums and landfills are considered respectively to be the 'apparatus').

Various fixation reagents may be used in particular embodiments of the present invention. The specific reagents to be used in any given application may be selected by those skilled in the art of the invention depending upon the requirements of that application. Different fixation reagents may be considered suitable from a technical point of view, and the factors that will determine which reagent is selected will include the solubility of fixed metal compounds that are formed by the reaction between the fixation reagent and the soluble metal, the stability of the fixation reagent over time under the relevant conditions in the apparatus, and other technical attributes affecting the suitability of the reagent for the specific application as understood by those skilled in the art, as well as the practical considerations of the availability of the reagent and cost. Fixation systems that use relatively high dosages of reagents may not be suitable for certain applications, as higher dosages result in the use of more space in the apparatus. Dosages of reagents may be varied by the incorporation of multiple types of containers. For example, pellets may be used in addition to bags to increase the reagent dose.

Some of the fixation systems that may be used in accordance with various aspects of the present invention are described below. The following discussion is not intended to limit the type of fixation system or systems that may be utilized by the invention. In accordance with the present invention, those skilled in the art can evaluate alternative fixation systems and select a suitable fixation system for each application of the invention. For example, fixation reagents and systems that may be useful in various embodiments of the present invention are disclosed in: "Chemical fixation and solidification of hazardous wastes" J. R. Conner, Van Nostrand Reinhold (1990); U.S. Pat. No. 5,202,033 (Stanforth et al); U.S. Pat. No. 5,527,982 (Pal et al); U.S. Pat. No. 5,536,899 (Forrester); U.S. Pat. No. 4,629,509 (O'Hare et al); U.S. Pat. No. 4,280,925 (Kiefer); commonly owned U.S. Pat. No. 5,898,093 (Vos); International Patent Publication WO 96/14901 (Vos); and commonly owned U.S. Pat. No. 5,877,393 (Webster); all of which are hereby incorporated by reference. In various embodiments, liquid and/or solid fixation reagents may be utilized. The reagents are selected on the basis of their ability to ameliorate the leaching of soluble metals from a specific type of apparatus by reacting with the soluble metal in the apparatus to form a fixed metal compound that is less soluble than the soluble metal compound. The suitability of a fixation system may be routinely assayed using established protocols such as the U.S. EPA's TCLP or SPLP.

The control of pH may be used in accordance with the present invention to fix soluble metals. Precipitation of solubilized metals as hydroxides or carbonates may be accomplished by the use of calcium compounds such as quicklime (CaO), hydrated lime ($Ca(OH)_2$) or carbonate ($CaCO_3$); magnesium compounds such as oxide (MgO) or hydroxide ($Mg(OH)_2$); or sodium compounds such as sodium hydroxide (NaOH) or sodium carbonate ($Na_2CO_3$). Those skilled in this art will know that there are certain characteristics of metal hydroxides that influence the choice of this fixation system. For example, many metal hydroxides are amphoteric; that is, they are resolubilized at both high and low pHs. Accordingly, the use of hydroxide fixation reagents may be contraindicated where the soluble metal forms amphoteric hydroxides. Dosage rates which are established based on passing the aggressive, low pH extraction fluid of the TCLP may result in failures when the less aggressive extraction fluid of the SPLP is applied. Accordingly, pH control may not be the best fixation method in certain circumstances. In some situations, it may be desirable to combine pH control with other fixation systems in order to obtain the most favorable results.

A neutralization reaction involving the fixation reagents, in the case of acidic waste streams, may be extremely exothermic. This may present operational problems. The use of quicklime raises this concern, in that an exothermic slaking reaction contributes additional heat. Also, the use of a carbonate may release $CO_2$, which could limit its acceptability in confined spaces (such as some of the battery applications noted below). Where the base is a carbonate, such as calcium carbonate, the reaction of the base with an acidic solution of soluble metal may cause effervescence. An appropriate amount of such effervescence may facilitate the fixation reaction by improving the mixing of the fixation reagent with the soluble metal. High pHs, approaching the potentially hazardous corrosivity of pH 12.5, could result from the use of some alkaline reagent systems.

An alternative fixation process involves cementitious systems. Portland cement, high alumina cement, and other cements may be used as fixation reagents. Soluble silicates may be used in combination with Portland cement. The soluble metals present in the waste may be reacted to some extent to form insoluble silicates, or in the case of high alumina cement, aluminates. Such fixation reactions may produce a low porosity, hardened fixed metal product with high tortuosity, which in turn encapsulates the metals (whether reacted or not). Alkaline pHs are typical in the cementitious treated waste, as may be measured in the final extraction pH in the TCLP test, often in the optimal range for limiting solubility of the soluble metals. Although the treated materials may pass the TCLP, due partially to the alkalinity of the treated waste, they may nevertheless fail the SPLP or leach high concentrations of amphoteric metals in the high pH condition which is associated with more normal disposal conditions. Fairly high dosage rates of fixation reagents may be required, in the 10% to 25% range in some embodiments, by wet weight of waste.

Many byproducts from such processes as cement or lime production, coal combustion and the like may be utilized as a replacement or partial replacement for cement in fixation processes of the invention that are similar in nature to cement fixation systems. Such byproducts include, among others, cement kiln dust, lime kiln dust, various types of coal fly ashes, and silica fume. Byproducts may be combined with Portland cement in some applications. Generally, the usefulness and limitations of these systems are similar to the Portland cement systems, but higher dosages of the byproducts may be required.

Oxidation or reduction reactions may play a part in fixation systems of the invention. Certain metals have solubility and toxicity concerns related to the valance state of the metal. For example, $Cr^{+6}$ compounds are generally highly soluble and very toxic, whereas $Cr^{+3}$ compounds generally are not. $As^{+3}$ compounds are generally more toxic, and may be more soluble depending on the fixation system used, than. $As^{+5}$ compounds. Therefore it is important to consider the possible need or utility of an oxidation or reduction treatment step as a part of the fixation regimen of the invention. Common oxidizers that may be used in accordance with this aspect of the invention include permanganate, hypochlorite, peroxide and chemical equivalents thereof. Common reducers include ferrous sulfate, sodium sulfites, various sulfides and equivalents thereof (aspects of which are discussed below in Example 3). In accordance with the invention, pH adjustments may be used to enhance the oxidation or reduction step of a fixation system. In some embodiments of the present invention, it may be important to utilize fixation systems which incorporate appropriate oxidation or reduction reactions. For example, sulfide reagents can be used for reduction and precipitation of hexavalent chromium.

Sulfide precipitation systems may be used in accordance with the present invention. Both soluble and relatively insoluble sulfide reagents may be used, at very low dosage rates in some embodiments, to react with metallic compounds in waste and precipitate the metals as sulfides. Most metal sulfides have extremely low solubilities over a wider range of pH than the corresponding oxides or hydroxides and they may therefore be more effective than cement-based systems in preventing solubilized metal releases into the environment. However, in some embodiments, there may be concerns that sulfide treatment may release $H_2S$, a toxic gas, during treatment. Also, fixed metal sulfides may resolubilize under oxidizing conditions.

In one embodiment, an absorbent mat may be provided comprising a hydrophilic fibrous material having incorporated therein as a fixation reagent a reactive metal sulfide, the reactive metal sulfide being capable of reacting with a soluble metal to form a fixed metal compound that is less soluble than the soluble metal. In one such embodiment, the mat may comprise a cellulosic material having zinc sulfide incorporated therein, such as is disclosed in U.S. Pat. No. 4,280,925 issued to Kiefer Jul. 28, 1981, which is incorporated herein by reference.

In alternative embodiments, the fixation reagents may be incorporated into a polymeric matrix that is adapted to permit contact between the fixation reagents and a solubilized metal. The matrix may be combined with a barrier in a laminated arrangement, and such a laminate may be built up by heat bonding or adhesive bonding or cast co-extrusion of polymeric materials making up the matrix and the barrier. Alternatively, a laminate structure may be obtained by applying a fixation-reagent-containing matrix as a surface coating (e.g. by printing or painting), such that the surface coating is applied with a laminar, regional or patterned coverage on a surface of a substrate, such as paper, polymer film, woven fibre, non-woven fibre, matting or a particulate material (such as chopped straw waste). Alternatively, such thermoplastic lamination and surface coating techniques may be combined.

The fixation-reagent-containing matrices of the invention may be applied to the surface of a substrate, such as the surface of a soluble-metal-containing apparatus. For example, the matrix may be applied as a layer underneath a product label, or as a binder within a structural member, such as a car body stiffening panel. In addition, in some embodiments the invention may be manufactured into disposal bags, sacks or the linings thereof. In some embodiments, bags of the invention may be used for the containment of heavy-metal-containing wastes, such as batteries or incinerator ash. In further alternative embodiments, the matrices of the invention, with or without barrier coatings, may be fashioned into landfill liners, pellets or flakes. In particular embodiments, the matrices of the invention may be adapted to enclose the fixation reagent in a 'dormant' state during the useable life of an apparatus, with degradation of the matrix (and barrier if there is one present) designed to occur on disposal of the apparatus. In this way, the matrix is adapted to liberate the fixation reagent at an appropriate time to react with soluble metals leaking from the apparatus to render them less soluble.

Phosphate precipitation systems may also be used in accordance with the present invention to fix soluble metals as phosphates. Soluble and relatively insoluble phosphate reagents may be used. In some embodiments, orthophosphates may be preferred. In some embodiments, these systems may advantageously be used in an alkaline environment, often with the addition of an alkaline additive, and may, for example, be effective in reducing the leaching of solubilized lead, zinc, cadmium, and copper from wastes. In some embodiments, relatively low dosage rates may be required, in some embodiments in the range of 2% to 10% phosphate by weight of soluble metal waste, in combination with 5% to 10% alkaline reagent by weight of waste. Resolubilization of metal phosphates in acid conditions may be a concern, and some metal phosphates may also resolubilize at high pHs.

A combination of sulfide and phosphate precipitation may be used as another aspect of the present invention. Combinations of sulfide and phosphate reagents may be effective for reducing the leaching of soluble metals over a wide range of pH conditions. The addition of the phosphates may prevent oxidation of the fixed metal sulfide compounds, providing long term stability for the fixed metal sulfide reaction products. Such sulfide and phosphate fixation reagents are, for example, the subject of copending, commonly owned U.S. Pat. Nos. 5,898,093 and 5,877,393, incorporated herein by reference (and may be available under the trade name Molecular Bonding System™ (MBS™) from Solucorp Industries of West Nyack, N.Y.). Very low dosage rates of phosphate and sulfide may be required, in the range of 2% to 10% total dry reagent weight as a percentage of the total soluble metal waste wet weight, in some embodiments.

Various sorbents may also be used as fixation reagents in the present invention. Such sorbents may be used in combination with other fixation reagents, to capture and fix soluble metals. In some embodiments, this approach involves the sorption of soluble metal compounds into the interior or onto the surface of the absorbing or adsorbing material. Fixation reagents may subsequently react with the sorbed metals. Materials that may be used as sorbents include activated carbon; metal oxides; synthetic materials such as activated alumina, organic polymers, zeolites and equivalents thereof; natural materials such as clays (with or without modification), Fuller's earth, diatomaceous earth (with or without modification), peat moss, vermiculite, natural zeolites and equivalents thereof.

In alternative embodiments of the present invention, the fixation reagents may be novel or selected from reagents known in the art, such as those discussed above, and equivalents thereof, so that the fixation reaction will occur within the specific apparatus, or in the vicinity of that apparatus, resulting in the amelioration of migration of solubilized metals from the apparatus into the environment. The system that is selected for each application will preferably provide an appropriate type and quantity of reagents to effectively prevent release of soluble metals from the apparatus of the invention.

The following examples are provided to illustrate specific embodiments. In view of the foregoing discussion and the following examples, the invention may be adapted to other apparatuses which contain soluble metals in a form that may leach into the environment during storage, use, or disposal. Accordingly, although various embodiments of the invention are disclosed herein, other adaptations and modifications may be made within the scope of the invention.

EXAMPLE 1

Lead-Acid Batteries

The term lead-acid battery generally refers to a secondary storage battery in which the electrodes comprise lead, and the electrolyte comprises diluted sulfuric acid. A major use of lead-acid batteries is in vehicle starting applications. Most vehicles use a 12-volt battery with a capacity in the range of 40–60 Ah. A typical battery weighs about 14.5 Kg or 32 lb, and has a sufficient high-rate capacity to deliver the 450–650 A necessary to start an automobile engine. Approximately 60% of the battery's weight is lead or lead components. A lead-acid battery is typically comprised of multiple cells, typically six cells in an automotive battery, with each individual cell containing lead plates and sulfuric acid.

Soluble lead waste may be released from a lead-acid battery as a result of breakage, spillage or leakage from the battery. Such lead waste may be produced within the battery via a sulfation process in which lead sulfate is produced on the positive and/or negative plates of a lead-acid battery during discharge as the result of a chemical reaction between sulfuric acid and lead dioxide of the positive electrode, or between sulfuric acid and the metallic lead of the negative electrode.

Potential damage to the environment from lead-acid batteries may be related to: (1) the leakage that sometimes occurs during use or storage when a battery casing is cracked, (2) leakage that occurs during improper storage when the battery is not kept in an upright position, and (3) improper disposal of batteries. Battery leakage may contain lead, antimony or other metals. Battery leakage is typically strongly acidic, and can therefore cause damage to equipment or the surrounding soil due to its corrosivity.

In one embodiment of the invention, a mat may be added to the outer casing of a lead-acid battery. The mat may be made of absorbent material (such as hard cardboard, ceramic, natural or synthetic fabric, diatomaceous earth, vermiculite or equivalents thereof) selected so that it can absorb and retain fixation chemicals within its matrix. The mat may be impregnated with fixation reagents prior to its use in the construction of the battery. For example, Molecular Bonding System™ (MBS™) reagents (available from Solucorp Industries Inc.) may be used with an impregnated stiff cardboard mat (these reagents and their use are described herein and in copending, commonly owned U.S. Pat. Nos. 5,898,093 and 5,877,393 and International Patent Publication No. WO 96/14901, all of which are incorporated by reference). The mat may be placed inside the battery casing during its construction, in a manner that provides a guard against release of liquids from the bottom and sides of the battery in the event that the battery casing is cracked. The mat may also be coated with a polymeric or alternative coating that is rupturable to expose the mat to the soluble metal.

Referring to the embodiment shown schematically in FIG. 1, casing mat 10 may be housed between inner battery casing 12 and outer battery casing 14. Fixation reagents impregnating casing mat 10 may react with soluble metals that are released if cracks form in inner battery casing 12. Such cracks may for example occur during the removal, transport, handling or storage of a lead-acid battery. Inner battery casing 12 thereby constitutes a rupturable barrier between the fixation reagents and the soluble metal housed in the battery.

Capsules 16 of fixation reagents may be used, as shown in the embodiment of FIG. 1, either alone or in combination with casing mat 10. Capsules 16 containing fixation reagents may be housed in each cell 8 of lead-acid battery 6. The barrier formed by the outer surface of capsule 16 may be adapted to maintain the integrity of the capsule during normal use of the battery, but to rupture and allow release of fixation reagents preferably after the useful life of the battery is complete. Breakable capsule materials such as glass, plastic and equivalent materials may be used to facilitate the release of fixation reagents by breaking the capsule. Alternatively, other materials, such as polymers and gels, may be used that dissolve over time to release reagents. In alternative embodiments, release of the fixation reagents from capsules 16 may be activated manually or automatically in response to the lapse of time or a change in the condition of the battery, such as a pH change. Capsules may be used to release fixation reagents that work to fix soluble metals and optionally to neutralize sulfuric acid or absorb free liquids in the battery.

For example, as shown in FIG. 1, capsule 16 comprising a neutralizing fixation reagent such as sodium hydroxide, calcium hydroxide or other neutralizing reagent may be positioned on wall 20 of each battery cell 8. Capsule 16 may be manually broken with plunger 18, preferably at the end of the useful life of the battery. Alternatively, capsule 16 may be automatically ruptured by an actuated plunger (not shown). Plunger 18 may be actuated, for example, in response to a pH change in the battery which is monitored by a sensor (not shown) that triggers a plunger actuator (not shown). Capsules 16 may have an outer coating of glass, plastic or other equivalent breakable material that forms a breakable capsule. Plunger 18 may slidingly extend through a seal (not shown) in the top of the battery casings 12, 14. A venting mechanism (not shown) may be included in casings 12, 14 to allow for the release of pressure that may build up within cells 8 when neutralizing fixation reagents are released from capsule 16 (such pressure build up may be due to the heat from an exothermic neutralization reaction).

Capsule 16 may contain a sufficient amount of a neutralizing fixation reagent to bring the sulfuric acid solution in each cell 8 to a pH level between about 4 and about 9, and preferably near neutral. In a typical embodiment of a standard automobile battery where there are six cells, six capsules may be utilized. The amount of neutralization reagent that is used in each cell 8 may be predetermined based on the size of the battery cells 8 and the strength of the sulfuric acid in the battery 6. In one embodiment of a typical 12-volt automotive battery, approximately 1½ oz. of sodium hydroxide, or an equivalent base, may be required in each cell 8. When capsule 16 is ruptured in the presence of a sulfuric acid solution, an exothermic reaction may occur while the solution is neutralized.

Cell mat 4 comprising fixation reagents may be provided along the bottom of each cell 8 (with or without alternative casing mat 10). Cell mat 4 may have a heat labile coating, so that an exothermic reaction caused by the release of neutralizing fixation reagents from capsule 16 will melt the coating of cell mat 4. When the coating of cell mat 4 melts, soluble lead in each battery cell 8 is exposed to the fixation reagents in cell mat 4. In such an embodiment, the heat labile coating of cell mat 4 constitutes a rupturable barrier between fixation reagents and a soluble metal. In one embodiment, such a coating may be polymeric, such as a heat sensitive or pH sensitive plastic 10 coating. In some embodiments, plycarbonate plastics may be used as coatings in formulations that are acid resistant but have weak resistance at alkaline pHs.

In alternative embodiments capsule 16 may be dissolvable, adapted to automatically release neutralizing fixation reagents at some point in time, preferably near the end of the life of the battery. In a further alternative, an additional plunger may be provided for rupturing cell mat 4, or a single plunger may serve to rupture both capsule 16 and cell mat 4, the plunger being adapted to break capsule 16 first and then, with further actuation, to break open cell mat 4.

In one embodiment, net shown, fixation reagents, such as calcium sulfide, triple superphosphate, calcium carbonate and calcium hydroxide, in dry form, may be encapsulated in a breakable glass or polymeric material in a cell of the battery without a plunger. The fixation reagents may remain in the capsule, in their solid form, until such time as the battery casing is crushed. At that time, the casing and the container are ruptured and the soluble metal and the fixation reagents may react to form insoluble lead compounds, thereby immobilizing soluble lead ions present in the spent sulfuric acid, and also having the potential in some embodiments to form a reaction layer of lead sulfide on the surface of the remaining metallic lead of the battery electrode, to help prevent further solubilization of the lead.

An absorbent material may be included in alternative embodiments of capsules that may be adapted for neutralization of battery acid. The absorbent may be vermiculite, diatomaceous earth, and equivalents thereof which would absorb the liquid in the battery. Such absorbents may be used in combination with fixation reagents, including neutralizing fixation reagents.

In an alternative embodiment of a lead-acid battery, capsule(s) containing fixation reagents may be positioned at or near the bottom of a cell(s) where they may be ruptured, preferably at the end of the useful life of the battery. The capsules may contain a sufficient amount of fixation reagent to react with lead sulfate that has accumulated in the bottom of the battery during the battery's life. The release of the fixation reagents may be triggered by the heat released from a neutralization reaction or a change in pH associated with a neutralization reaction triggered by the rupture of capsules as described above. Capsules, mats or equivalent alternative containerization means for retaining fixation reagents known to those in the art may be utilized in various embodiments of the invention.

In an alternative embodiment, a capsule may be positioned on the bottom of each cell; the capsule including a highly absorbent material, a neutralizing fixation reagent, and additional metal stabilizing fixation reagent(s), such that the battery acid may be absorbed and neutralized and the soluble metals fixed when the capsule is ruptured.

In some embodiments, the integrated fixation system of the invention offers dual protection against hazardous lead-acid contamination. One mode of protection being a casing mat (as previously described), which protects against the premature and accidental release of contamination through breakage of the casing of the lead-acid battery. The other mode of protection being capsules or mats that are rupturable at an appropriate time to provide internal protection (preferably after the useful life of the battery) against spillage during handling, storage, recycling or illegal dumping. Various embodiments may comprise multiple mats and capsules which will neutralize the battery's sulfuric acid solution and stabilize soluble metals. Absorbents may also be included in various embodiments of such mats and capsules to ameliorate fluid leakage.

Those skilled in the art will understand that, in accordance with the present invention, a variety of neutralization and fixation reagents may be suitable for use with a variety of containers that could be used to make fixation reagents accessible to soluble metals in a variety of lead-acid batteries.

EXAMPLE 2

Hi—Cd Batteries

Figure 2:
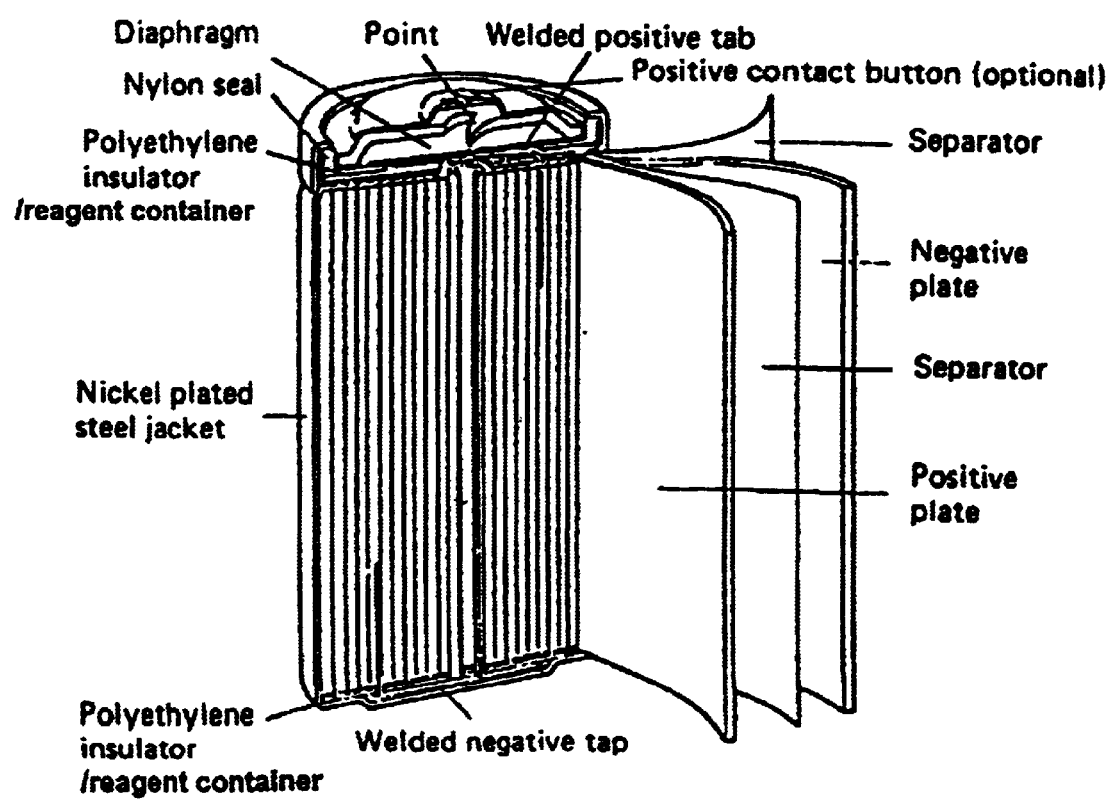
FIG. 2 is an isometric view of a nickel-cadmium (Ni—Cd) battery comprising a polyethylene insulator/fixation reagent container.

As used herein, the term Ni—Cd rechargeable battery generally refers to a secondary storage battery in which the positive electrode comprises primarily nickel hydroxide, in some embodiments as a coating over a sintered nickel substrate, and the negative electrode comprises cadmium, also over a sintered nickel substrate in some embodiments. The electrolyte, in a typical embodiment, is an alkaline compound such as potassium hydroxide or other hydroxide. The electrolyte may be absorbed within a non-woven nylon or polypropylene fabric which serves as a separator between the electrodes. In a typical embodiment, no free electrolyte is present in the dry cell configuration. A "jelly-roll" construction is typical in cylindrical cell embodiments, in which the positive electrode, separator and negative electrode are rolled up together and placed in a nickel-plated cylinder. The cover which acts as the positive terminal, is typically connected to the nickel-plated case, which acts as the negative terminal, with the incorporation of an insulating seal. FIG. 2 shows an embodiment of a cylindrical rechargeable Ni—Cd battery that incorporates these features.

Ni—Cd battery leakage may contain cadmium and nickel. The leakage may also be alkaline. When batteries are left in equipment, the leaks can damage or ruin the equipment. Improper disposal of Ni—Cd batteries can result in leaching of cadmium and nickel from the metallic components of the battery into the environment.

In accordance with the present invention, a seal or insulating member of a Ni—Cd battery may be supplemented by the addition of a fixation reagent container. In one embodiment, the container may take the form of an O-ring, which is inserted between a seal member and the battery casing. The O-ring may be made of an absorbent material that can absorb and retain fixation chemicals within its matrix. For example, the O-ring may be made of absorbent fiber which has been pretreated with sulfide or phosphate or combinations thereof with or without a base, as described in Example 3 herein. In alternative embodiments, a mat may be provided as an alternative or in addition to an O-ring. Such a mat may be made of an absorbent material which has been impregnated with fixation reagents and coated to prevent premature release, or of a sandwich-type material, with the fixation ingredients in the middle of the sandwich. It would be positioned as a liner on the inside of the cylinder. For example, paper or fiber might be used which has been treated with the MBS™ reagents. The O-ring or mat in such embodiments may be coated with a rupturable barrier, such as a polymeric or vitreous material, which material may be nonconductive. In one embodiment, the O-ring or mat may be coated with a thin plastic sheet, such as polyethylene.

As an example, a Ni—Cd AA battery may contain approximately 13 to 22% cadmium, 20 to 32% nickel, and 4% hydroxide. An AA Ni—Cd battery may weigh about 26 grams. Accordingly, in such an example, approximately 5 grams of cadmium and 7 grams of nickel would be present. In order for this amount of cadmium and nickel to be fixed, about ½ gram of fixation reagents may be provided in an O-ring and/or mat containers (including polymeric matrices comprising fixation reagents, including such matrices when formed into disposal bags).

Those skilled in this art will understand that a variety of fixation reagents may be suitable for use in a variety of containers in various Ni—Cd batteries.

EXAMPLE 3

MBS Reagents

In one aspect, the fixation reagents of the present invention may be a combination of a sulfide and phosphate, and optionally a base (sometimes referred to herein as the "MBS™" reagents). In accordance with this aspect of the invention, once the container retaining the fixation reagents is ruptured, the present invention provides a process for treating soluble metals comprising:

(a) contacting the soluble metal with a mixture of one or more of the following components, preferably in combination:
(i) a sulfide selected from the group consisting of calcium sulfide, calcium polysulfide, sodium sulfide, sodium hydrosulfide and iron sulfide,
(ii) an inorganic phosphate and (iii) a base, preferably including calcium hydroxide. In one embodiment, calcium sulfide is a preferred component of the fixation reagents.

In some embodiments, although it is to be avoided in other embodiments, water may be provided in the apparatus, for example in the composition in the capsule. The amount of water may be selected to adjust consistency of the fixation reagents at the time of reaction with the soluble metal so as to assist mass transfer.

The sulfide, phosphate or other reactive component of the fixation reagents may be provided in an amount optimized for approximately stoichiometric reaction with the soluble metal in the waste. In one embodiment, the sulfide may be used in an amount that is approximately the stoichiometric equivalent of the soluble metal in the apparatus. Similarly, in one embodiment, the phosphate may be used in an amount that is approximately the stoichiometric equivalent of the soluble metal in the apparatus. Alternatively, the sulfide and phosphate together may be used in an amount that is approximately the stoichiometric equivalent of the soluble metal in the apparatus.

In one aspect, the phosphate in the capsule composition may precipitate ferric iron that is present in the waste, so that the redox potential of the waste environment is rendered insufficient to oxidize the fixed sulfide metal compound. In one embodiment, orthophosphates are preferred phosphates in the fixation reagents. In particular embodiments, preferred phosphates are calcium phosphate, phosphorus anhydride ($P_2O_5$), and triple super phosphate (TSP), alone or in combination. TSP is manufactured by the addition and evaporation of sulfuric acid on commercial calcium carbonate. The resultant product (which may be used as a fertilizer or food additive) typically contains varying levels of phosphoric acid, calcium dihydrogen phosphate, dicalcium hydrogen phosphate, tricalcium phosphate, residual calcium carbonate and silica grit.

A base may be provided as a component of the fixation reagents. In one embodiment, an amount of base is provided which is calculated to act rapidly to bring the initial pH of the soluble metal-containing mixture in the apparatus to above 8.0 when the barrier separating the fixation reagent and soluble metal is ruptured. In preferred embodiments, the base may comprise calcium carbonate or calcium hydroxide or both. The base is preferably of small particle size. The base component may be used in an amount sufficient to provide 2 or more times the amount of neutralization capability as there is acid generation potential in the sulfide used as a fixation reagent. The amount of base may be adapted to suppress the generation of hydrogen sulfide gas from a sulfide fixation reagent.

EXAMPLE 4

Fixation Reagent Films

This example relates to the incorporation of fixation reagents in a polymeric matrix. Those skilled in this art will understand that a wide variety of polymers may also be used to produce polymeric matrices incorporating fixation reagents. In accordance with this aspect of the invention, in addition to fixation reagents, a wide variety of components may be used in formulating the polymer matrix, such as surfactants, plasticisers and colorants. The ingredients of a matrix are preferably selected so that the fixation reagents are inert with respect to the polymer matrix, so that the fixation reagents do not chemically react with tie matrix during formulation or subsequently.

The degradable or permeable matrix may be comprised of a wide range of polymeric materials, such as: polyvinyl acetates (PVAc); polyvinyl alcohols (PVA); co-polymers of PVAc and PVA; hydrateable or degradable acrylic polymers, such as NEOCRYL (trademark) of Zeneca or JONCRYL (trademark) of Allied Colloids; sugar, starch or cellulose based materials, such as ethyl cellulose or hydrolyzed corn starch; biodegradable films or films capable of being degraded by sunlight, such as poly-hydroxylated polymers and co-polymers, PVA, polyethylene glycol (PEG), poly (beta hydroxybutyrate), polycaprolactone, BIOMAX™ of DuPont, BIOPOL™ of Zeneca, ECOFLEX™ of BASF, or the biodegradable plastics disclosed in International Patent Publication WO 98/39382 (incorporated herein by reference). In some embodiments, polymers may be selected that are not cross linked, to facilitate solubilization of the matrix. Polymers that do not exhibit an increase in molecular weight of the polymer during formation of the matrix may exhibit preferred solubility characteristics in some embodiments.

In some embodiments, the polymer of a degradable matrix may be water soluble at ambient temperatures that are likely to be encountered in a waste disposal environment. For example, the matrix may be selected based on its solubility at about 20° C. over a defined period. For example, in alternative embodiments, polymers may be selected that are completely soluble in water at in 20° C. over periods of: 30 minutes, 1 hour, 12 hours, 1 day, 1 week, 2 weeks, or 1 month. For example, PVA and PVAc polymers or copolymers may be selected having the desired characteristics. In some embodiments, for example, partially hydrolyzed PVAc resins may be selected for appropriate solubility, such as by selecting resins with an appropriate degree of hydrolysis.

In some embodiments, matrices that are water soluble may be combined with fixation reagents that are relatively water-insoluble. Such matrices may have the advantage of leaving a fixation reagent residue in place when the polymeric components of the matrix have been leached away. For example, polymeric matrix components having solubilities at 20° C. as given above, may be combined with fixation reagents that are substantially insoluble in water under the same conditions over the same (or longer) time period. In this way, for example, a polymeric component that is solubilized in water at 20° C. in 30 minutes may be combined with a fixation reagent that is insoluble in water at 20° C. over the same or a longer period, such as 1 hour, 12 hours, 1 day, 1 week, 2 weeks, or 1 month.

A barrier or surface coating which does not include fixation reagents may be provided on the matrix to adapt the physical properties of the resultant sheet or film for particular uses. A thin relatively water-insoluble barrier may for example be used to temporarily protect a water soluble matrix (for example as disclosed in International Patent Publications WO 92/01556 and WO 93/22125, which are hereby incorporated by reference). The barrier may be comprised of materials such as the matrix materials set out above, and the following materials or combinations thereof: a perforated thermoplastic film as described in U.S. Pat. No. 4,939,030; a flawed surface coating such as described in IE 98/00028; a moisture penetrable material such as wax bonded woven or non-woven fibers, as described in International Patent Publication WO 92/15454; a water degradable surface coating, such as a water soluble polyvinyl alcohol or polyvinyl acetate film or co-polymer thereof (including ethylene and styrenic co-polymers); water swellable or softenable coatings of acrylic or polyurethane; biodegradable films or coatings capable of being degraded by bacteria and/or sunlight, such as poly-hydroxylated polymers and co-polymers, polyvinyl alcohol, polyethylene glycol (PEG), poly(beta hydroxybutyrate), polycaprolactone, BIOMAX (trademark) of DuPont, BIOPOL FY (trademark) of Zeneca, ECOFLEX (trademark) of BASF; sugar, starch or cellulose based materials; a temperature degradable coating, such as described in U.S. Pat. No. 5,268,222; a pH sensitive coating, such as the one described by BG-2,195,919A which is only soluble at highly alkaline pHs or the one described in U.S. Pat. No. 5,508,101 which is only soluble at highly acidic pHs.

A barrier coating may be applied by generic screen or flexographic printing techniques, which may be adapted to provide a very thin barrier coating with relatively few flaws when dry. Alternatively, such coatings may be applied by brush or spray painting. In some embodiments, barrier coating formulations may be selected to provide a smooth finish with acceptable drying times and minimal flashing on a particular substrate.

In alternative embodiments, the fixation reagent(s) may be selected from materials or reagents capable of interacting with a solubilized metal of interest to render the metal less soluble in water, such as: agents which absorb and or adsorb heavy metals such as Fuller's earth, activated carbon; agents which retain heavy metals by ionic attraction, such as ethylenediamine-tetra acetic acid (EDTA) and its salts or ion exchange resins (e.g. DOWEX(trademark) resins of Dow Inc.); agents that react with solubilized metals to form insoluble salts, such as sulfides or phosphates; reducing compounds that reduce solubilized metals to produce less soluble forms of the metal; and, agents that cause the precipitation of fine soluble metal materials from colloidal suspensions or solutions, such a SUPERFLOC (trademark) effluent treatment and flocculating agents of Cytec.

In some aspects of the invention, the fixation reagent(s) and/or components of the matrix will be soluble in water to varying degrees. Such embodiments may be adapted for use with a particular soluble-metal-containing apparatus, in which the solubility of the metal over time is generally known (for example by empirical measurement). In such circumstances, the components of the invention may be selected so that the matrix is at least as soluble as the fixation reagent. In addition, the fixation reagent may be at least as soluble as the soluble metal. The invention may accordingly be adapted so that when an apparatus is disposed of together with a film of the invention, the matrix will degrade at least as quickly as the metal will become solubilized, and once the matrix has degraded to become permeable, the fixation reagent will be mobilized by the solvent at least as easily as the soluble metal is mobilized by the solvent, so that under a given set of environmental conditions the fixation reagent will become available to react with a solubilized metal at an appropriate time.

In some embodiments, matrices that are water-soluble may be preferred to matrices that are only porous (or that only become porous in use). This is because a porous matrix may become plugged with insoluble deposits when the fixation reagent reacts with a solubilized metal. Soluble matrices may be adapted to avoid this potential problem by virtue of the fact that the polymeric matrix itself is degraded, and preferably in such embodiments degraded substantially completely, to expose the bulk of the fixation reagent.

In alternative embodiments of the invention matrices may be formulated using polyvinyl alcohol (PVA) and polyvinyl acetate (PVAc) polymers or co-polymers. Parameters that may be varied in the formulation of PVA and PVAC matrices are well known in the art, such as the relative amounts of monomer and solvent, the choice of solvent and the speed of drying. PVA and PVAc resins are widely available commercially, as are other ingredients that may be used to alter the properties of the matrix. For example, PVA matrices may be formulated from approximately 75%–80% hydrolyzed PVA with an average molecular weight of about 20,000.

The pH of the fixation reagent may affect the polymerization of the matrix. Accordingly, acids and bases may be used to adapt the fixation reagent to facilitate incorporation into a particular matrix. In some embodiments, bases such as $CaCO_3$ or $CaOH$ may be useful for this purpose as a component of the fixation reagent.

In some embodiments, part hydrolyzed PVAc may be selected as the matrix resin. Such a matrix may be adapted to have the ability to eventually swell on exposure to moisture to render the matrix permeable, and yet be impervious to partial to temporary immersion in water. Such a matrix may be bonded to a wide variety of substrates or thermoplastically welded and glued to, and may be biodegradable in appropriate environmental conditions.

A solution of 35% hydrolyzed PVAc resin in meths/methyl acetate may for example be used (such as ALCOTEX 359B (trademark)). Solvents for use in formulating PVAc matrices may include isopropyl alcohol and ethyl acetate. The speed of matrix drying during formulation may be varied in such embodiments by adjusting the ratio of the more volatile ester to the alcohol. To modify the surface finish, other agents may also be added that effect drying, such as 1-methoxypropan-2-ol (DOWINOL PM from Dow) or dipropyleneglycol methyl ether (DOWINOL DPM from Dow). Waxes, such as a wax dispersion in isopropanol (such as CERACOL 99), may be employed to modify the matrix properties. Silicone based anti-blocking agents may also be used, although in some embodiments they may interfere with binding of laminate layers to the matrix. Surfactants may also be used in the matrix, for example to aid in the incorporation of pigments and surface wetting on application. Alternative surfactants may be organic salts (such as ALCOPOL O) or non-ionic agents such as BRIJ (trademark), SPAN (trademark), and TWEEN (trademark) type surfactants. Anti-foaming agents may be usefully added to the matrix in some embodiments to inhibit flaw formation during application. Examples of such anti-foaming agents are FOAMEX 825 (trademark, Tego Chemie) or silicone oil type anti-foam agents. Plasticisers may be added to improve the flexibility of the matrix or barrier coating, which may be particularly useful to facilitate adhesion of the matrix or barrier to flexible substrates such as polyethylene. Examples of plasticizing agents are dibutyl phthalate, dioctyl phthalate, dioctyl sebacate, dioctyl adipate or tributyl citrate butyric acid ester. Colorants can be used directly in the matrices. All such optional additives to the matrix or barrier are to be selected based on their ability to achieve a desired result, while not interfering with the ability of the films and matrices of the invention to stabilize soluble metals.

The proportion of fixation reagent in the matrix may vary with the intended application of the film. In some embodiments, fixation reagent may be used in the range of from 1% to 75% by total weight of the matrix (including fixation reagent), alternative proportions include 5%, 10%, 15%, 20%, 25%, 30%, 35%, 40%, 45%, 50%, 55%, 60%, 65% or 70%. Those skilled in the art will be able to select such parameters based on the desired properties. Higher concentrations of fixation reagent may have the effect of raising the melting temperature of the matrix and increasing the stiffness of the matrix. Lower concentrations of fixation reagent may be used to facilitate thermoplastic modifications to the matrix, such as the manufacture of extrusions. For example, matrices incorporating 5% to 10%, or about 50% fixation reagent may be used in alternative applications. Polymers may be selected accordingly.

In some embodiments, solid fixation reagents may be incorporated into a resin matrix, such as a PVAc resin, by bead mill or shear head mixing. Alternatively, fixation reagents may be mixed into a liquid matrix solution. Fixation reagents may affect the viscosity of a matrix solution, and this parameter may be adjusted using appropriate solvents. For example, matrices to be used for painting surfaces may in some embodiments be adjusted to have a viscosity of 20–50 cPs. The dispersion stability of fixation reagents may be affected by the particle size of the fixation reagents, which may be more finely ground to facilitate stability, and by additives such as polymeric hyper-dispersants.

The polymeric matrices of the invention may be used in a wide variety of applications, such as blown films that may in turn be used in a wide range of manufactured products. Applications may for example include product labels, disposal bags, packaging, extruded items and injection moldings. Disposal bags or containers of the invention may bear a printed indication of the amount of fixation reagent incorporated into the item, or an indication of the capacity of the item to store particular soluble-metal-containing apparatuses. For example, a disposal bag of the invention may have a label thereon indicating the approximate number of batteries (such as nickel-cadmium batteries) that may be disposed of in the bag.

In some embodiments, the fixation reagents and matrix may be selected to be preferentially soluble at a particular pH, such as an acid pH (particularly the acidic pH of the TCLP assay). Calcium sulfide is an example of a fixation reagent that is sparingly soluble in water and preferentially soluble at an acidic pH. Such reagents may be preferred where the soluble metal that it is intended to treat is one that will be preferentially solubilized at an acidic pH. For example, under some acidic conditions, Ni—Cd batteries may be capable of leaching heavy metals. One aspect of the invention is a bag for disposing of Ni—Cd batteries, wherein the bag is comprised of a film that includes a water-soluble matrix composed in part of calcium sulfide. In some embodiments, the matrix may be comprised of PVA or PVAc. The fixation reagents of the matrix may further comprise an inorganic phosphate, such as TSP, and a base or bases, such as $CaCO_3$ and $Ca(OH)_2$.

In one embodiment, a thermoplastic film of the invention comprises laminated layers A through E as follows:

A: an optional decorative coating or moisture resistant barrier applied by painting, printing or adhesive, or as a heat bonded lamination;

B: a fixation-reagent-containing matrix comprised of TSP and $CaCO_3$ in a PVAc matrix, applied as a coating at approximately 11 $g/m^2$ (dry basis);

C: a PVAC barrier coating at approximately 1.5 $g/m^2$ (dry basis);

D: a fixation-reagent-containing matrix comprising CaS and $CaCO_3$ in a PVA matrix applied at 50–300 $g/m^2$, containing 1–8 $g/m^2$ CaS;

E: an optional decorative coating or moisture resistant barrier applied by painting, printing or adhesive, or as a heat bonded lamination. Alternatively, a pressure sensitive adhesive layer may be provided, which may include a slip-sheet (or release sheet).

To produce alternative embodiments of a film as described above, alternative embodiments of a CaS-containing PVA matrix were prepared (having densities of 67 $g/m^2$ or 292.5 $g/m^2$) containing 10% by weight CaS and $CaCO_3$ (in 1:1 weight ratio). A barrier layer of PVAc was applied approximately 12 microns thick, to leave a PVAc coat when dry of approximately 1.52 $g/m^2$. The TSP-containing PVAc matrix coating was applied on top of the dry PVAc barrier coat at a thickness of approximately 36 microns, to leave a dry coat containing about 11 $g/m^2$ of TSP and $CaCO_3$. Such films may be formed, for example, into plastic bags for disposal of soluble metal containing apparatuses. Such bags may be used by placing a soluble metal containing apparatus in the bag, and then disposing of the bag.

An alternative film embodiment may comprise the following layers:

A: an optional decorative coating or moisture resistant barrier applied by painting, printing or adhesive, or as a heat bonded lamination;

B: a fixation-reagent-containing matrix comprising CaS and $CaCO_3$ in a PVAc matrix applied at 9.7 $g/m^2$, containing approximately 1.3 $g/m^2$ CaS;

C: a PVAc barrier coating at approximately 1.5 $g/m^2$;

D: a fixation-reagent-containing matrix comprised of TSP and $CaCO_3$ in a PVAc matrix, applied as a coating of approximately 11 $g/m^2$ containing approximately 4.87 $g/m^2$ TSP;

E: a substrate selected from the group consisting of paper, plastic film, foil, woven or non-woven fibers and similar materials;

F: an optional decorative coating or moisture resistant barrier applied by painting, printing or adhesive, or as a heat bonded lamination. A pressure sensitive adhesive layer may be further provided, which may include a slip-sheet (or release sheet).

Depending on the substrate chosen for layer E in the foregoing example, the laminate film may be formed into a variety of products, such as bags or boxes, which may for example be used for containment of soluble metal containing residues such as incinerator ash. In alternative embodiments, such a laminate film may be manufactured in roll form for use as a ground barrier to detoxify percolating groundwater contaminated with heavy metals.

In an alternative embodiment, a glycerol plasticised PVA film was prepared (using SOTPLAST B2.30 from Solplax Limited) of approximately 60 $g/m^2$ density. To this film, a fixation-reagent containing matrix was applied (by roller painting) comprising $TSP:CaS:Ca(OH)_2:CaCO_3$ in an approximate weight ratio of 15.1:38.8:7.3:38.8. The matrix was applied at a wet density of 40 $g/m^2$, and contained 22 $g/m^2$ of fixation reagents. The matrix was prepared by adding 25 g of the fixation reagent mixture to 100 g of a PVAc resin in the presence of ethyl acetate (50 ml, 45 g) and 1-methoxypropan-2-ol (50 ml, 46.1 g). The PVAc resin was taken from a stock prepared by combining 75 ml (67.5 g) of ethyl acetate and 25 ml (23.05 g) of 1-methoxypropan-2-ol (DOWINOL PM), and then adding in series with stirring or gentle agitation: 300 g of ALCOTEX 359B (Harlow Chemical Co.), 10 g of CERACOL 99 (BYK Cera, and 2 g of ALCOPOL O Concentrate (Allied Colloids). The film laminate thus produced was cut up and mixed with samples of chopped Ni—Cd battery parts (the laminate being 10% by weight battery parts). This mixture was subjected to TCLP leaching. In control trials of battery parts leached without the film, the concentration of Cd in the leachate was 2,860 mg/l. When combined with the film, the concentration of Cd in the leachate was dramatically reduced to 15.6 mg.l. Similarly, the concentration of Ni in the sample without the film was 34.4 mg/l, which was reduced to 1.77 mg/l when the film was added to the battery parts for TCLP leaching.

In alternative embodiments, fixation-reagent-containing matrices, such as are described above, may be coated with PVAc coatings that contain adsorbents, such as activated carbon or Fuller's earth. Such coatings may be prepared by, for example, adding the adsorbent to the PVAc resin in place of the fixation reagents described above, for example adding 20% by weight of adsorbent. Such adsorbents have been useful in some embodiments to inhibit the release of hydrogen sulfide from films that contain CaS, particularly when the film is exposed to water. It was found that an adsorbent-containing PVAc coating of approximately 40 $g/m^2$ (wet weight) was capable of significantly reducing or eliminating the odor of hydrogen sulfide gas when applied to a film of the type described above comprising as fixation reagents $TSP:CaS:Ca(OH)_2:CaCO_3$.

What is claimed is:

1. A composition for fixing a solubilized metal, comprising:

a polymeric matrix having a fixation reagent incorporated therein or thereon, said polymeric matrix comprising a water-soluble polymeric component that is at least as water-soluble as the fixation reagent is under the same conditions, wherein said fixation reagent will react with a solubilized metal to form a fixed metal compound that is less soluble than the solubilized metal, and wherein the fixation reagent is selected from the group consisting of calcium sulfides, phosphates, and hydroxides.

2. The composition of claim 1, wherein the polymeric component is selected from the group consisting of partially hydrolyzed PVAc and PVA.

3. The composition of claim 1, wherein the fixation reagent comprises a sulfide, and the polymeric matrix further comprises an adsorbent capable of adsorbing hydrogen sulfide.

4. A composition of matter for fixing a solubilized metal, comprising:

a polymeric matrix having a fixation reagent incorporated therein or thereon, said polymeric matrix comprising a degradeable polymeric component selected from the group consisting of polyvinyl acetates (PVAc), polyvinyl alcohols (PVA), copolymers of PVAc and PVA, hydratable or degradeable acrylic polymers, ethyl cellulose, hydrolyzed corn starch, polyhydroxylated polymers and copolymers, polyethylene glycol, poly(beta-hydroxybutyrate), and polycaprolactone;

wherein the fixation reagent is selected from the group consisting of calcium sulfides, phosphates, and hydroxides and is capable of reacting with a solubilized metal to form a fixed metal compound that is less soluble than the solubilized metal.

5. The composition of claim 4, wherein the fixation reagent comprises a sulfide and the polymeric matrix further comprises and adsorbent capable of adsorbing hydrogen sulfide.

6. A composition of matter for fixing a solubilized metal, comprising:

a polymeric matrix having a fixation reagent incorporated therein or thereon, said polymeric matrix comprising a water-soluble polymeric component that is at least as water-soluble as the fixation reagent is under the same conditions, wherein said fixation reagent comprises a calcium sulfide, phosphate, or mixture thereof, and the polymeric matrix further comprises an adsorbent capable of adsorbing hydrogen sulfide.

7. A composition of matter comprising:

a polymeric matrix having a fixation reagent incorporated therein or thereon, said polymeric matrix comprising a water-soluble polymeric component that is at least as water-soluble as the fixation reagent is under the same conditions, wherein said fixation reagent is capable of reacting with a solubilized metal to form a fixed metal compound that is less soluble than the solubilized metal; and a solubilized heavy metal.

8. A composition of matter for fixing a solubilized metal, comprising:

a polymeric matrix having a fixation reagent incorporated therein or thereon, said polymeric matrix comprising a water-soluble polymeric component that is at least as water-soluble as the fixation reagent is under the same conditions, and wherein said fixation reagent is selected from the group consisting of calcium sulfides, calcium phosphates, and a mixture of calcium sulfides and calcium phosphates.

9. An apparatus comprising:

a solubilized metal separated from a fixation reagent by a barrier comprising a polymeric matrix having the fixation reagent incorporated therein or thereon, wherein said fixation reagent will react with a solubilized metal to form a fixed metal compound that is less soluble than the solubilized metal.

10. The apparatus of claim 9, wherein the solubilized metal is selected from the group consisting of the following elements and compounds thereof: lead, nickel, cadmium, mercury, zinc, silver, vanadium, arsenic, beryllium, selenium, antimony, barium, chromium, thallium, cobalt, uranium, plutonium, thorium, strontium, cadmium, and americium.

11. An apparatus comprising a barrier separating a solubilized metal from a fixation reagent, wherein the barrier comprises a polymeric matrix having a fixation reagent incorporated therein or thereon, and wherein said polymeric matrix is capable of being degraded by action of one or more of water, bacteria, sunlight, elevated temperature, and pH.

* * * * *

UNITED STATES PATENT AND TRADEMARK OFFICE
CERTIFICATE OF CORRECTION

PATENT NO. : 6,838,504 B1
DATED : January 4, 2005
INVENTOR(S) : Webster et al.

It is certified that error appears in the above-identified patent and that said Letters Patent is hereby corrected as shown below:

<u>Column 24,</u>
Line 42, delete "and adsorbent", insert -- an adsorbent --.

Signed and Sealed this

Twenty-third Day of August, 2005

JON W. DUDAS
*Director of the United States Patent and Trademark Office*